United States Patent
Hatcher et al.

[15] 3,703,316
[45] Nov. 21, 1972

[54] PAVEMENT CUTTING MACHINE

[72] Inventors: Cecil W. Hatcher; Gene Warner, both of P.O. Box 1263, El Monte, Calif. 91734

[22] Filed: March 1, 1971

[21] Appl. No.: 119,476

[52] U.S. Cl............................................299/39, 299/89
[51] Int. Cl..............................................E01c 23/09
[58] Field of Search................299/39, 40, 41, 86, 89; 51/176

[56] References Cited

UNITED STATES PATENTS

| | | | |
|---|---|---|---|
| 3,608,969 | 9/1971 | Fowkes | 299/39 |
| 926,232 | 6/1909 | Barrire | 51/176 |
| 2,400,906 | 5/1946 | Beck | 299/39 X |
| 2,319,520 | 5/1943 | Rypkema | 299/39 X |
| 3,409,330 | 11/1968 | Hatcher et al. | 299/39 |

*Primary Examiner*—Ernest R. Purser
*Attorney*—William E. Beatty

[57] ABSTRACT

A pavement cutting machine for cutting bumps or grooves. A tractor has a hitch with a cutter trailer and a tank trailer. The tank picks up the sludge from the cutter, filters it and recirculates the filtered water to the cutter. One or more hydraulic cylinders for the cutter or cutters act against a frame member which supports the tank whereby the weight of the tank snubs the cutter or cutters. The tractor has an alternative low speed drive from its engine. Alternative depth control is provided for the cutter for bump cutting or cutting grooves. The cutter is a single cutter or two cutters having overlapping shafts at their inner ends with the spacing between adjacent cutting disks the same as on each cutter for cutting grooves or overlapped for cutting bumps. A floating beam carried by a frame supports one end or both ends of the cutter or cutters. The frame pivots on a horizontal axis on a header having a hitch with the tractor. Hydraulic cylinders act on the frame and on each floating beam to move them to active or idle position.

22 Claims, 29 Drawing Figures

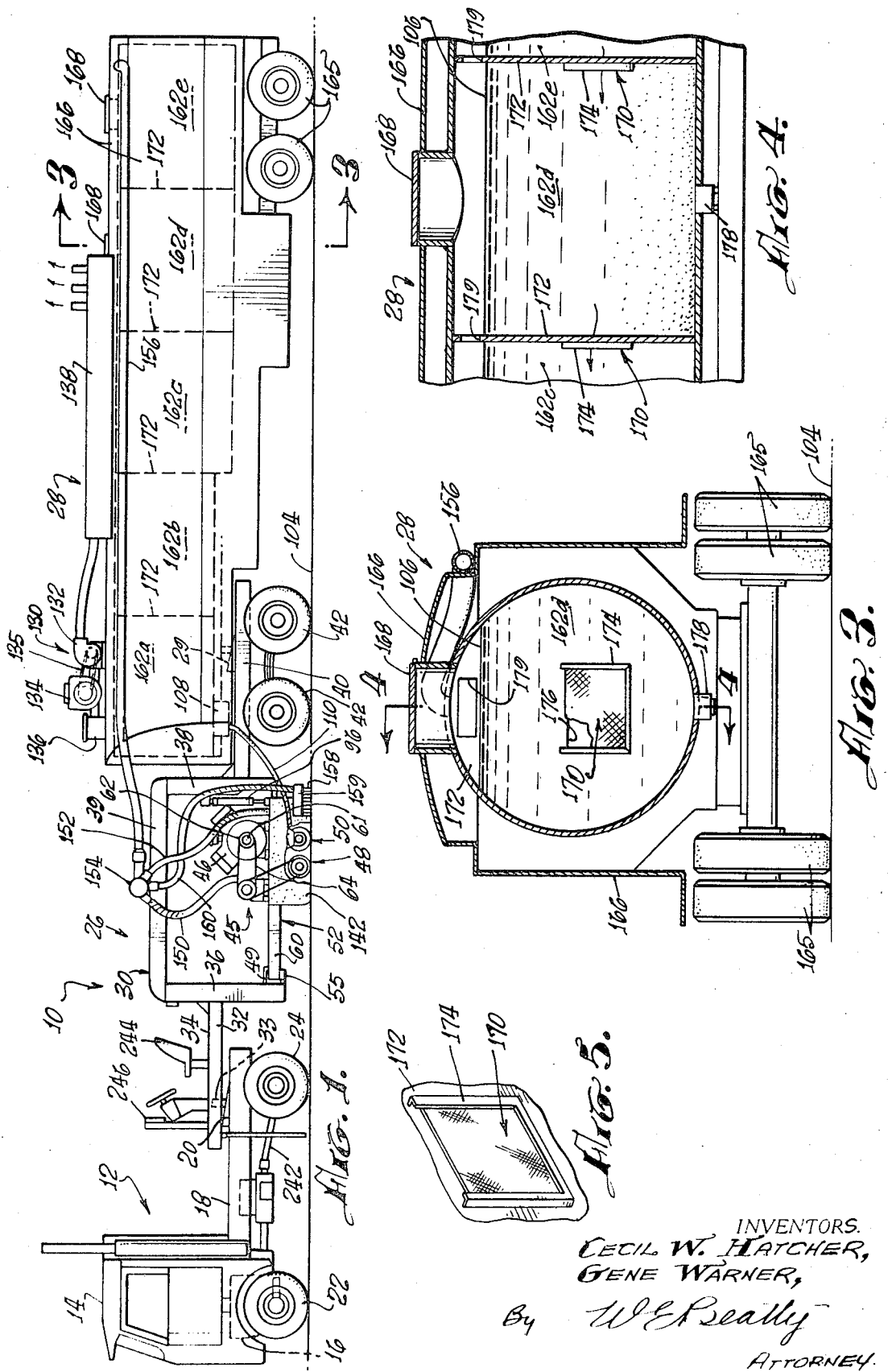

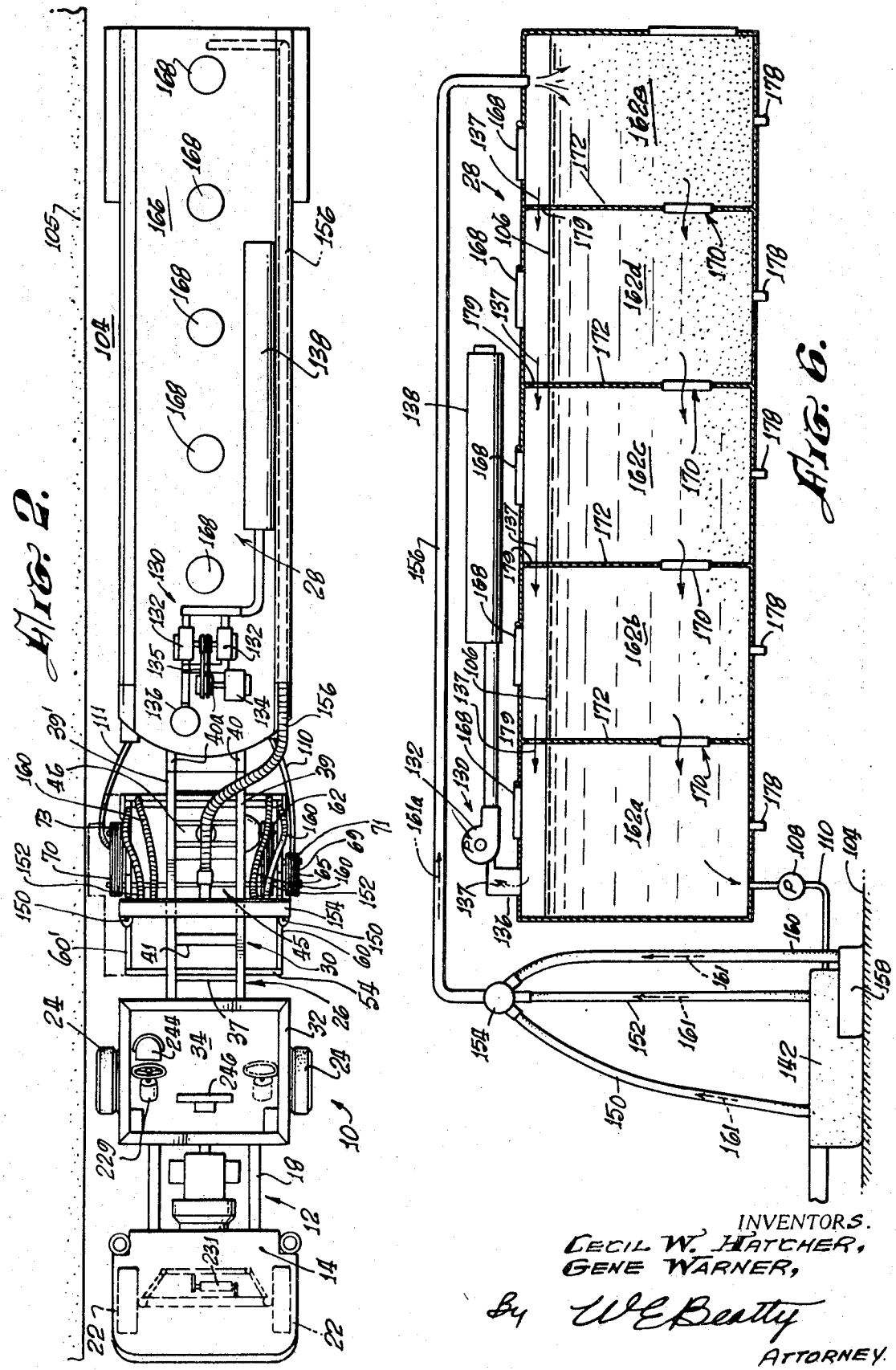

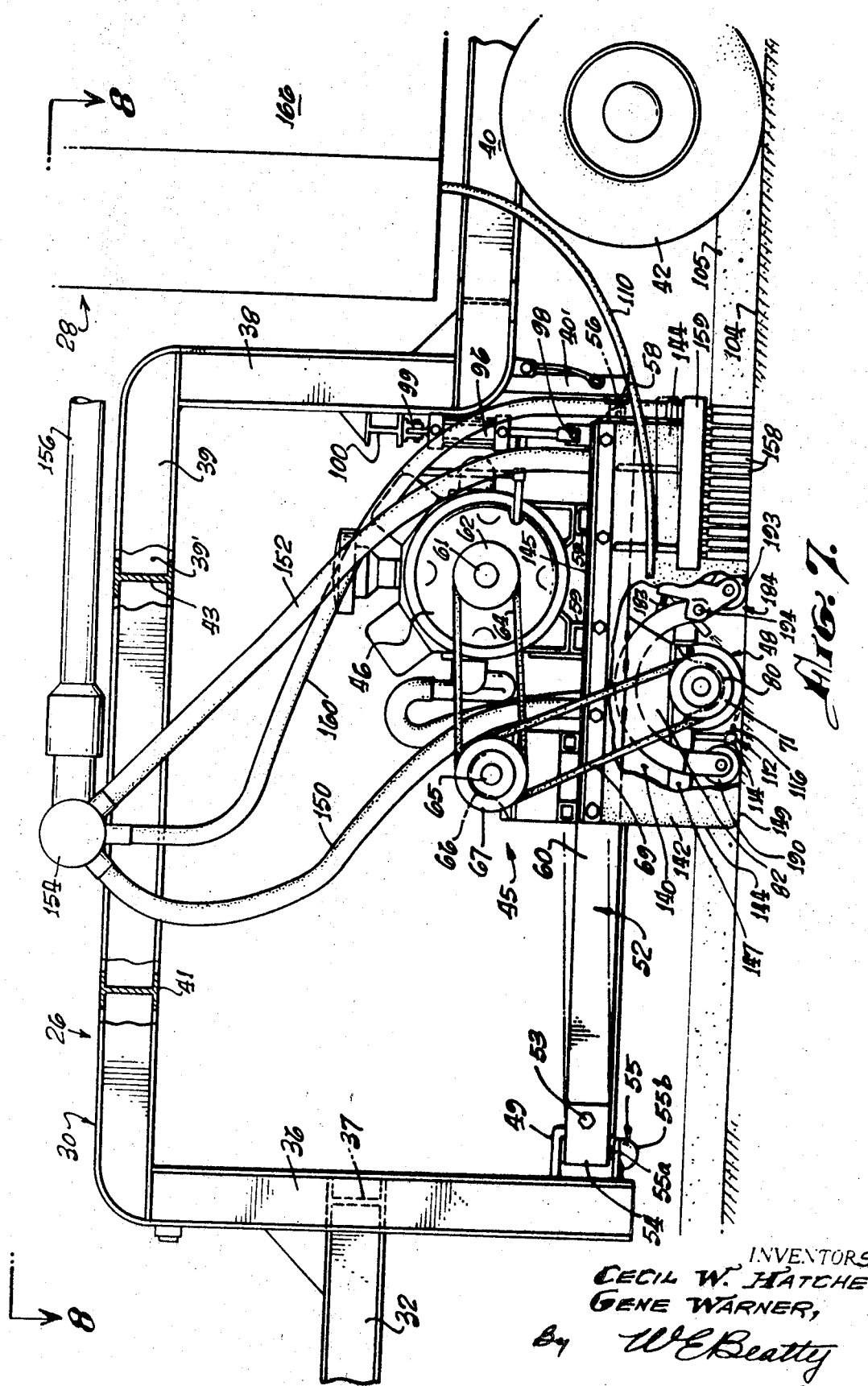

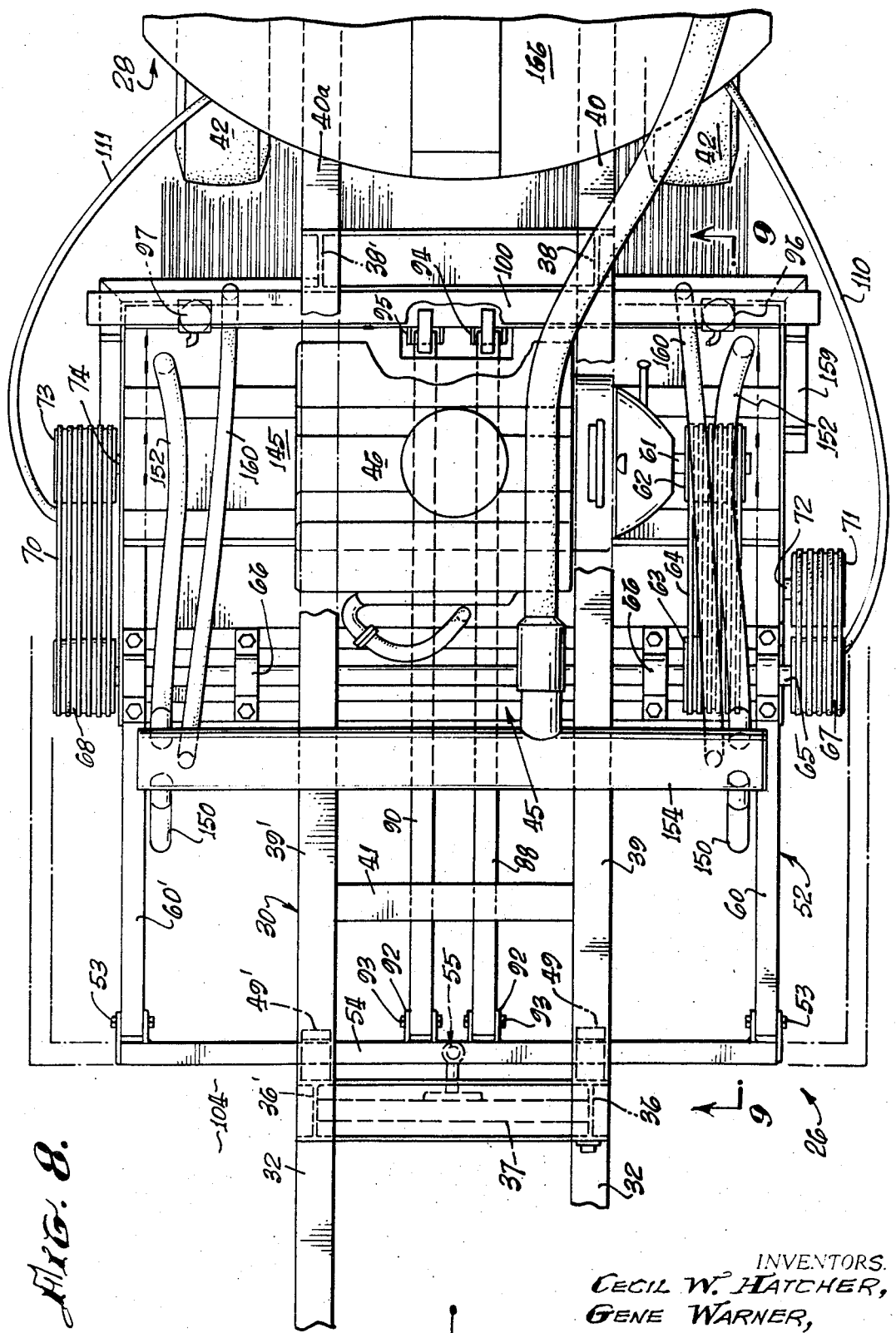

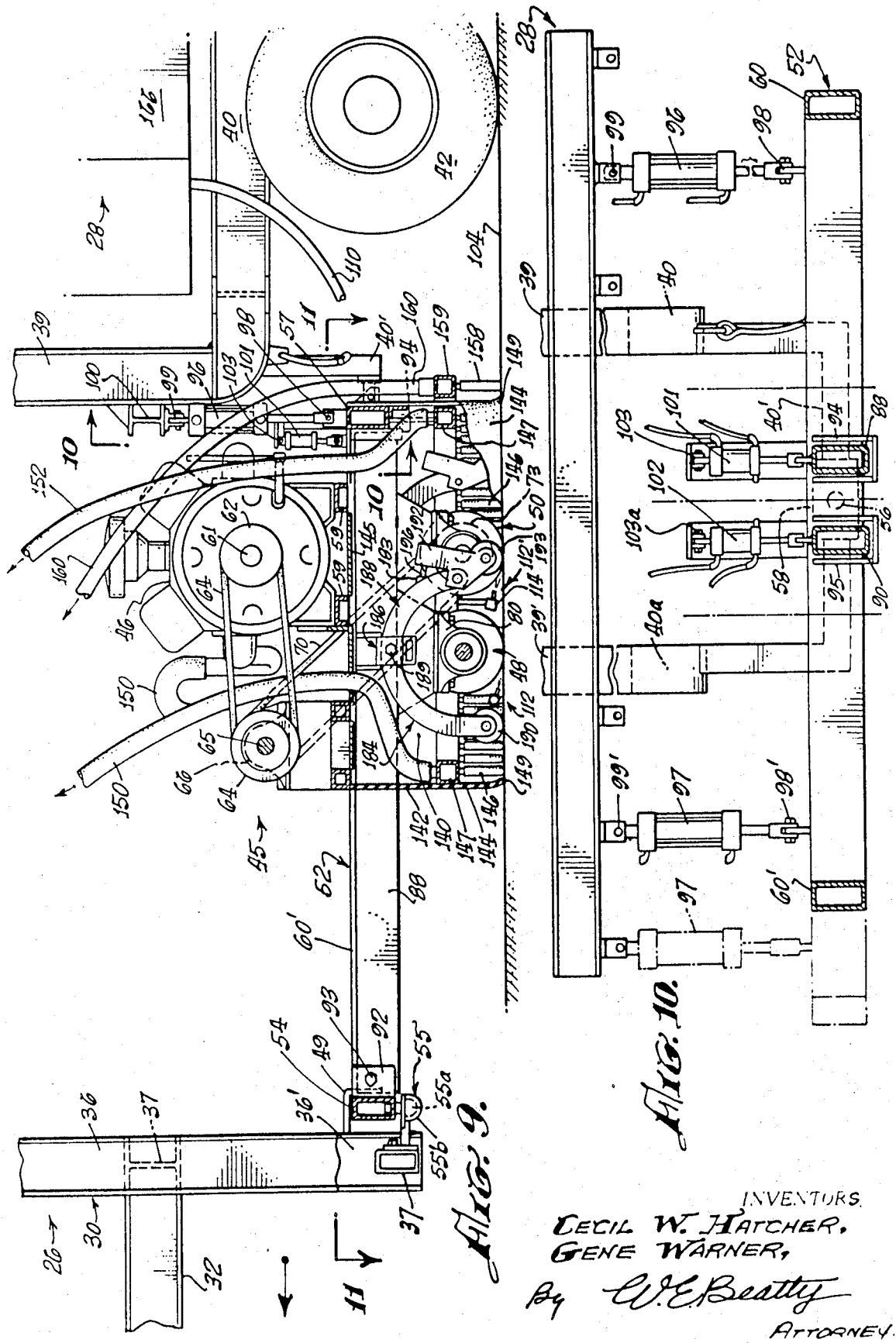

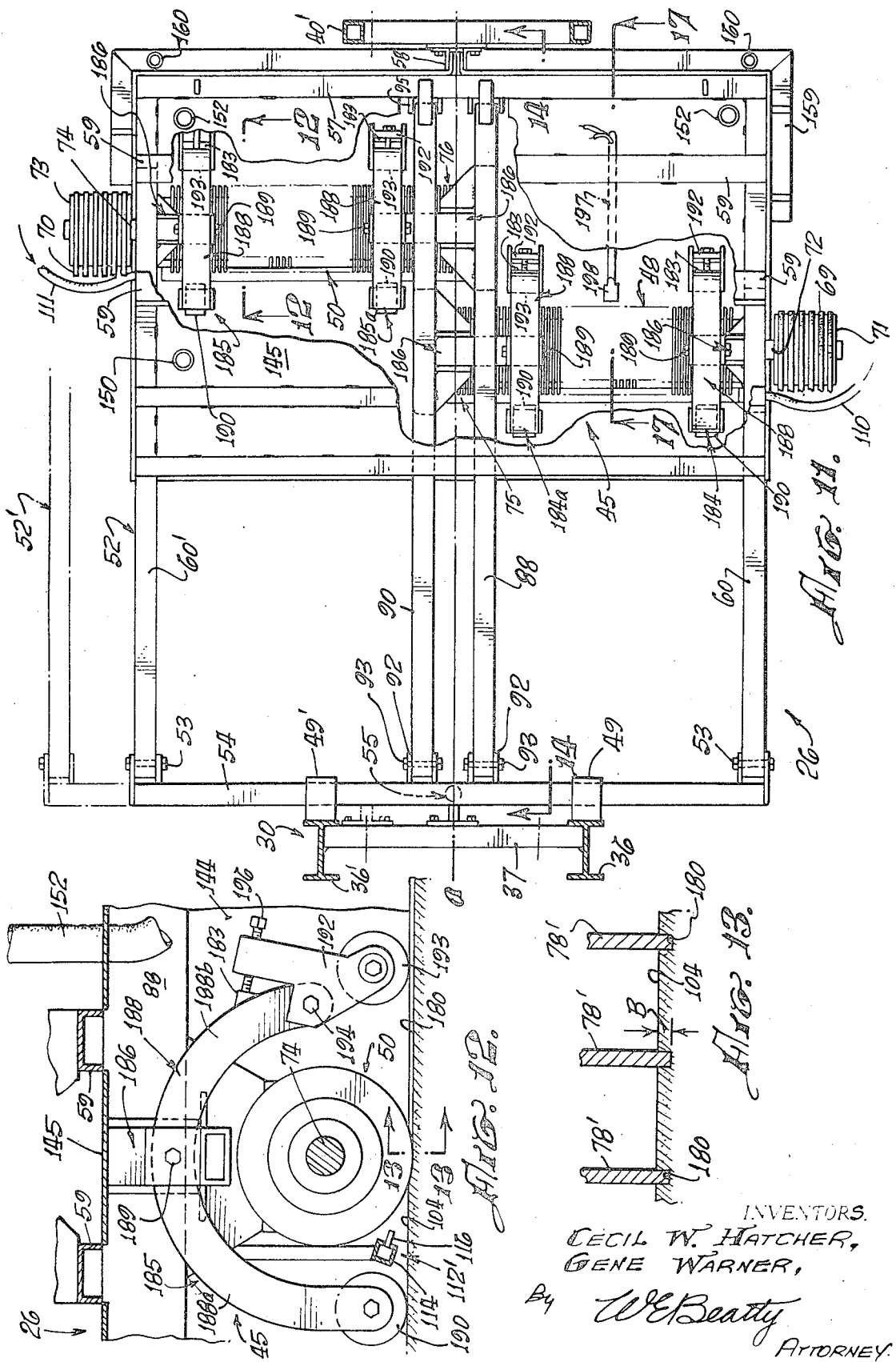

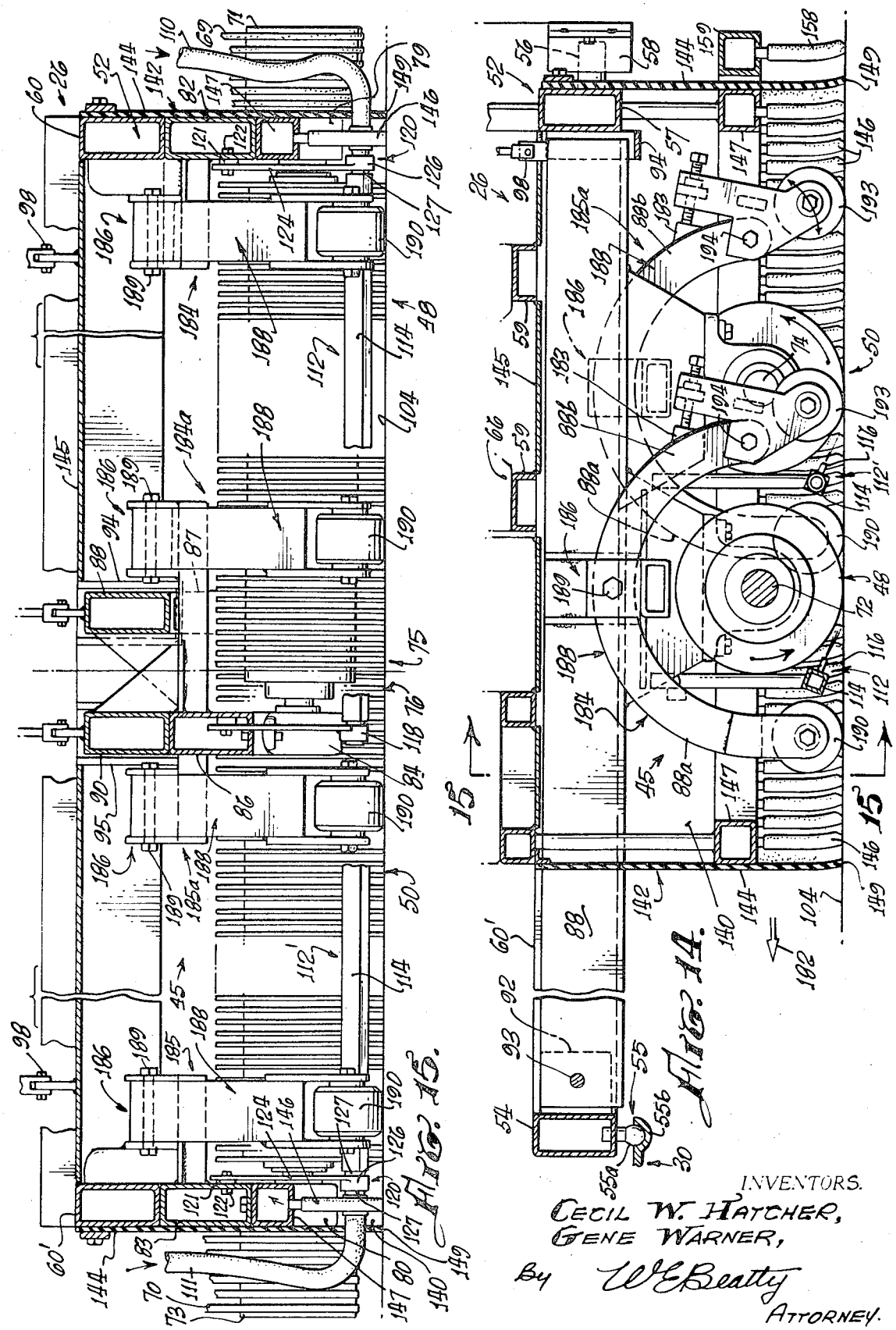

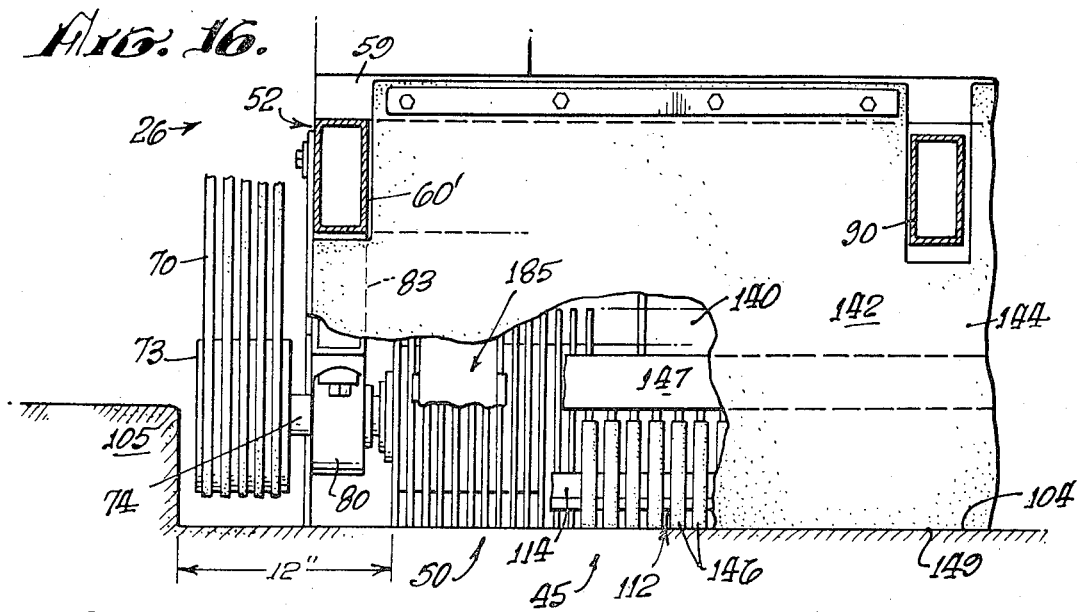
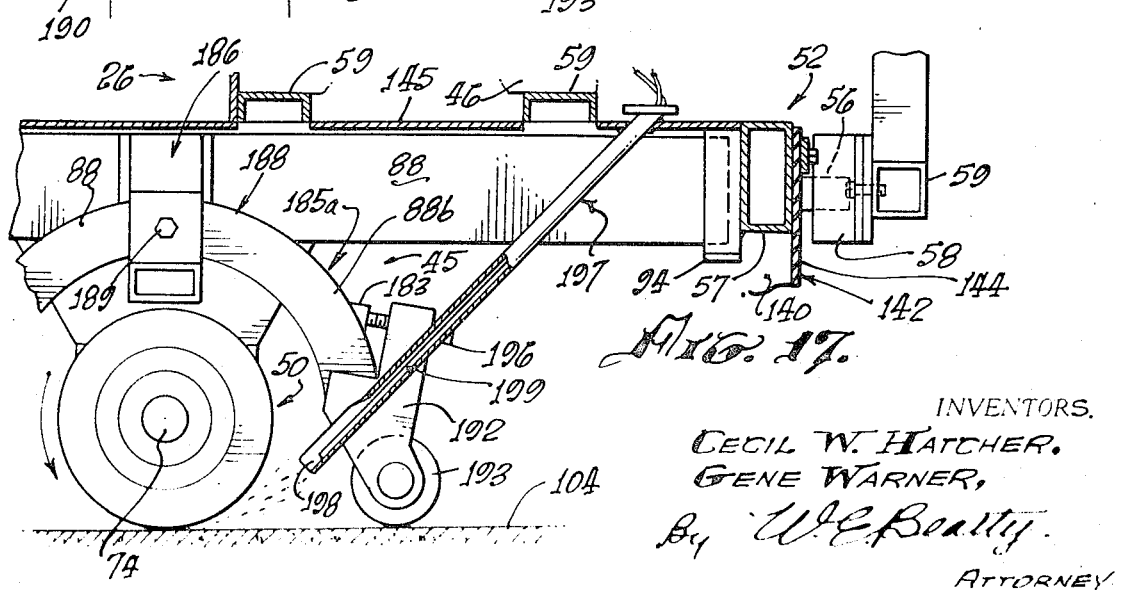

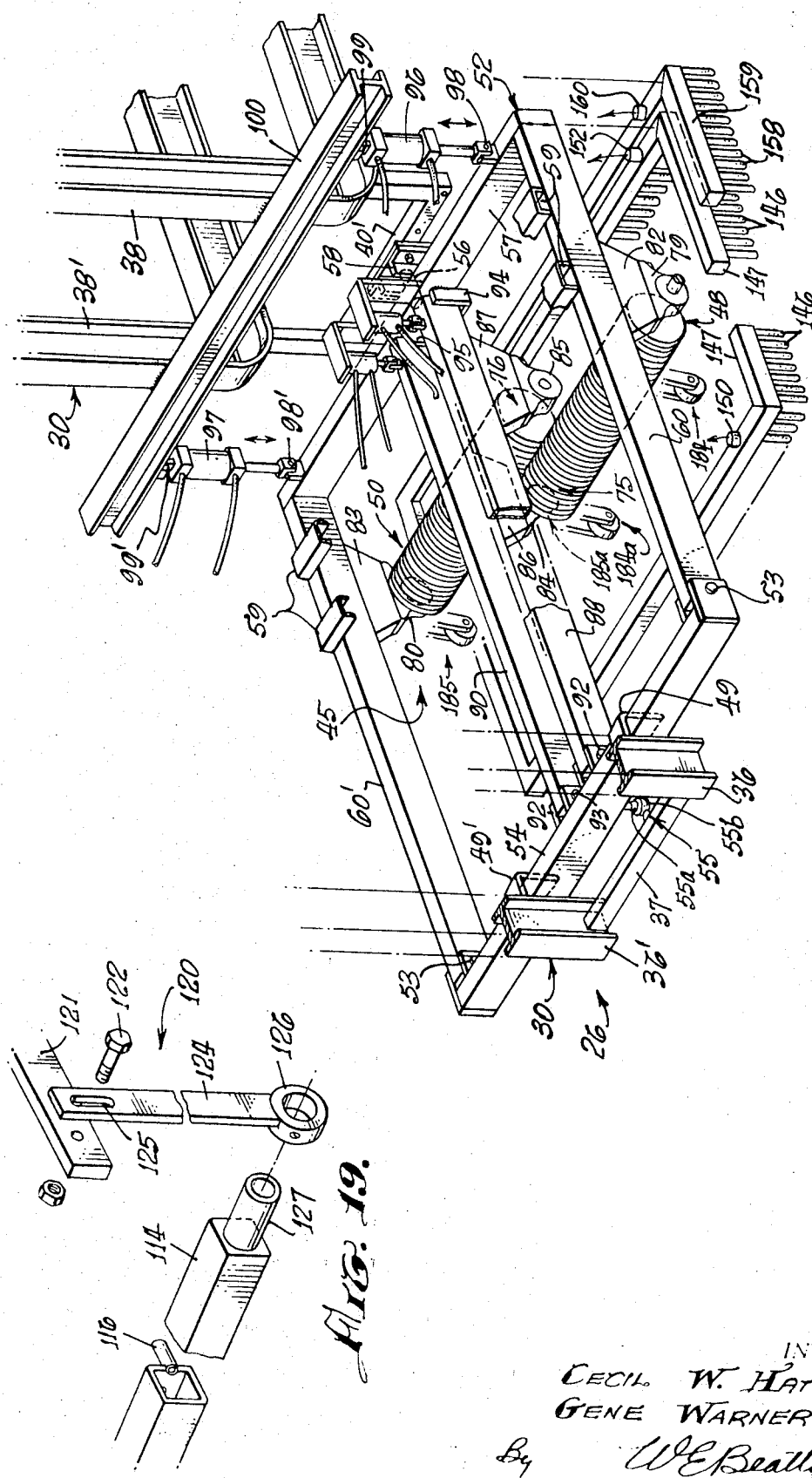

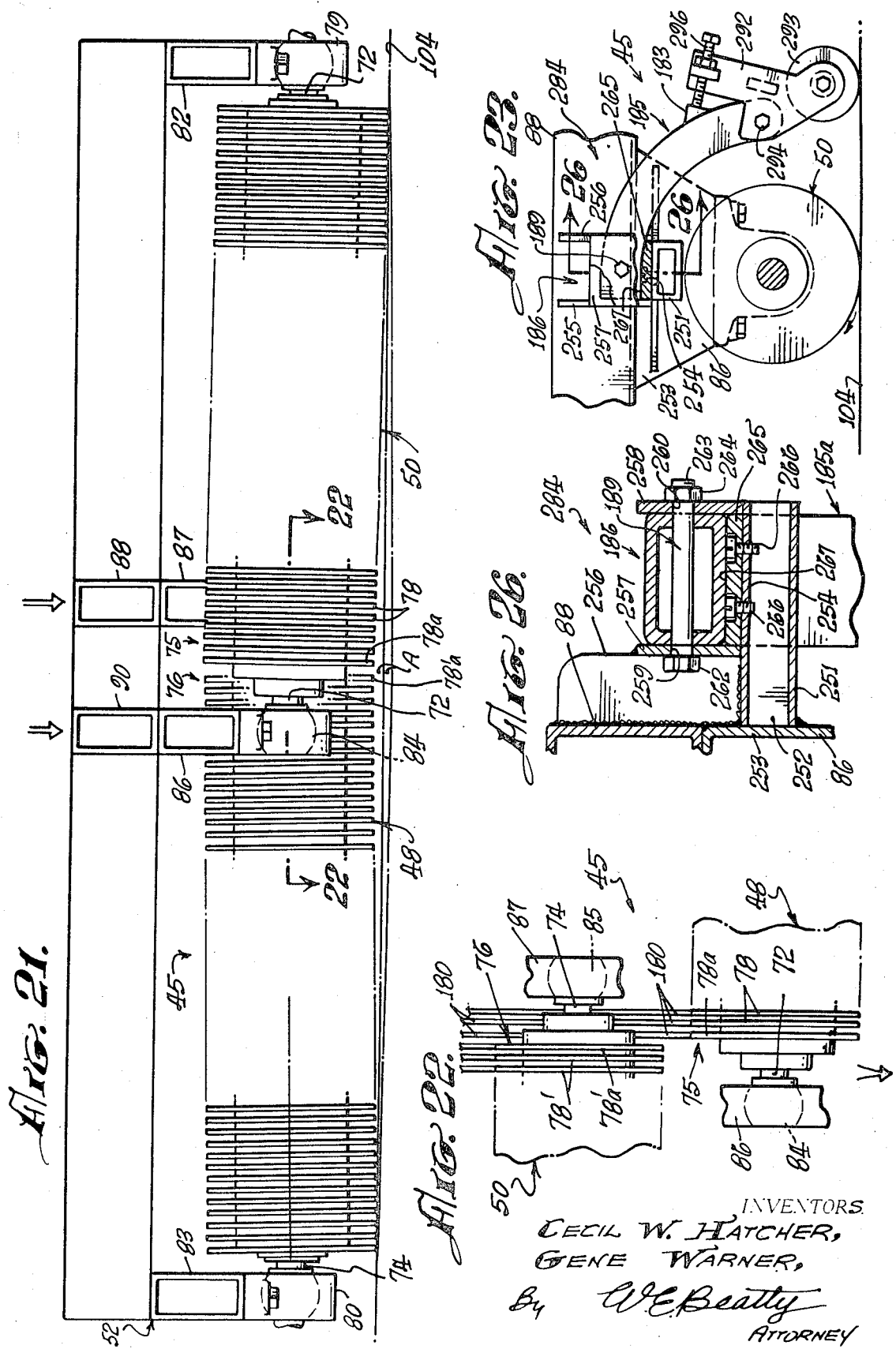

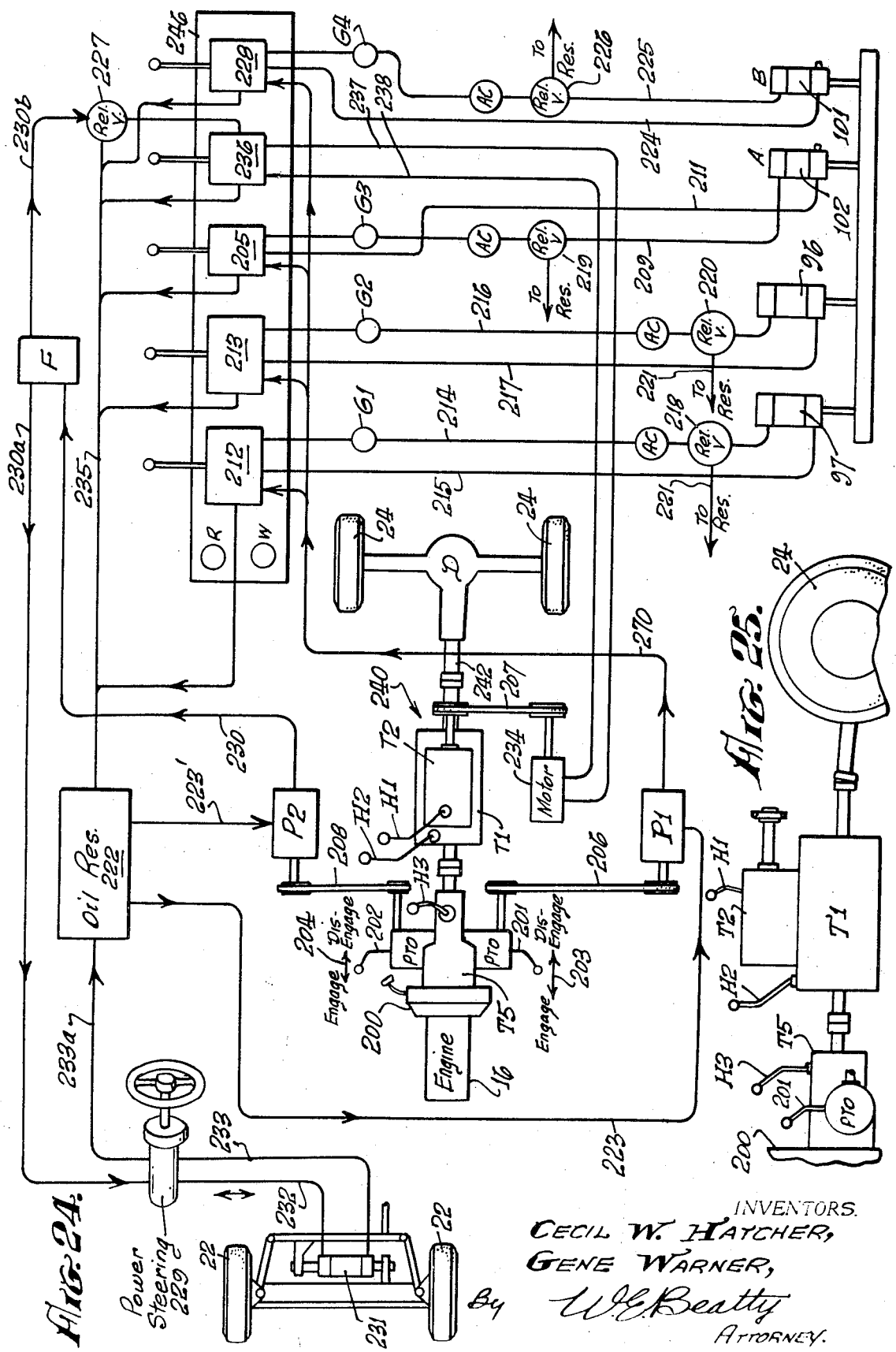

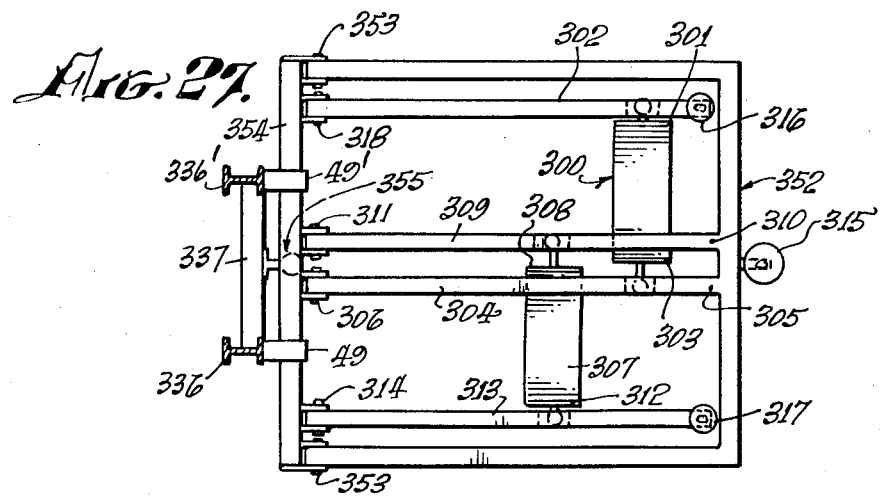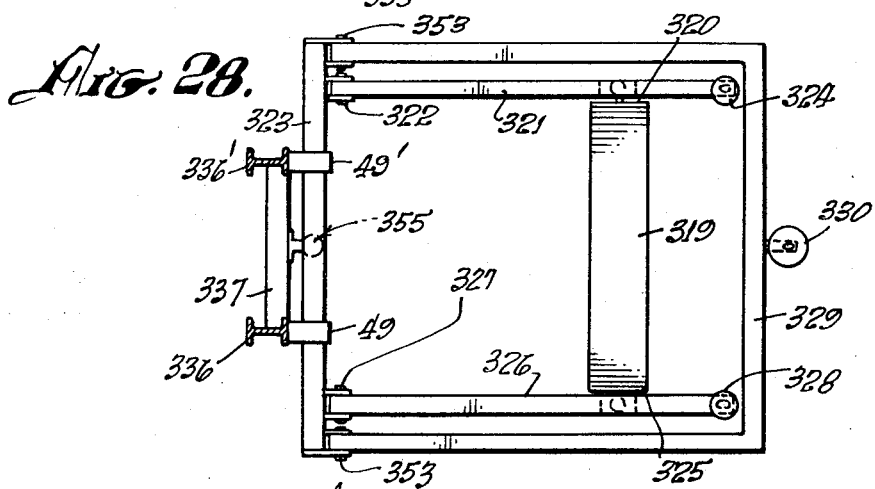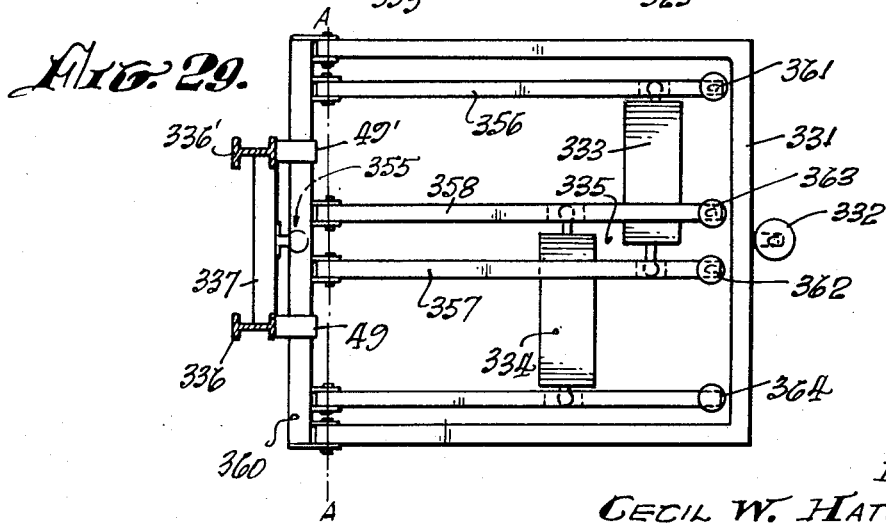

PAVEMENT CUTTING MACHINE

CROSS-REFERENCE TO RELATED APPLICATION

Concrete Pavement Cutting Machine, Ser. No. 118,909, filed Feb. 25, 1971 by Cecil W. Hatcher et al.

BACKGROUND OF THE INVENTION

1. Field of the Invention

The invention relates to a pavement leveling or grooving machine having a vehicle having a pavement cutter wherein a tractor pulls the cutter vehicle and a water tanker recirculating water to cool the cutter disks.

2. Description of the Prior Art

As is well known in the art, there are various machines used for grooving or leveling road surfaces. However, each of the known devices have limitations, and problems associated with them. One problem is the transporting of the machines from one operation site to another and, after reaching the site, being able to operate under ideal conditions to properly complete the work required. Another area where the present machines are lacking is the capabilities of keeping the required depth of the grooves as the cutter assembly, or assemblies, make their pass over a road bed having an uneven surface. It is also necessary to have a machine that is not only capable of grooving the road surface but, in addition, serving a dual purpose as a leveling apparatus.

A series of diamond blades or disks are generally used for the leveling and grinding of the grooves, these blades being very expensive and, if not properly protected from overheating, each can be damaged and become ineffective during its working operation. It is, therefore, necessary to supply a cooling system that will operate as long as needed while the blades are in operation. The cooling system is generally a liberal supply of water sprayed along the cutting edge of each blade as it rotates during a cutting or grinding operation. Apparatus is provided to continuously supply water to the cutting area during the complete cutting cycle having an extreme length of highway surface to be worked.

SUMMARY OF THE INVENTION

The invention comprises a dual tandem apparatus for leveling or grooving roads and highway surfaces, whereby cars and the like will be substantially protected from skidding, especially in wet weather. The dual tandem apparatus comprises a tractor having a cab section for transporting the entire machine down the highway to a work location, a first trailer section positioned intermediate the tractor and a second trailer section. The first trailer section is operably connected to the tractor as a pavement leveling and grooving machine, and the second and end trailer is a tanker for supplying a liquid coolant, such as water, to the grooving and leveling apparatus. The tractor section is adapted with the equipment and controlling apparatus to operate the movement of the entire vehicle while traveling down the highway to a work location by use of a direct drive to its rear-wheel drive at moderately high speeds with its total complement of trailers. If the Diesel engine in the tractor were to operate at low gear and drive the equipment at a slow speed, the engine's powerful direct drive would damage parts related to the grooving apparatus, if the parts met an obstruction. Hence, a hydraulic drive from the Diesel engine is provided to operate the entire system of the tandem trailer unit when the engine clutch is operated to disconnect the transmission from the traction wheels and engage a power take-off, to supply the hydraulic drive to operate the vehicle and its systems.

The leveling and grooving machine trailer section comprises either one or two rotary cutter units. If two are used, one of the units is supported in advance of the other, with their cutter shafts overlapping at their inner ends. Each assembly includes a plurality of cutting disks, or blades, separated by a certain spacing, depending on the use of the machine as a leveling or grooving device, the same spacing being preserved at the inner ends of the two cutter units. A somewhat U-shaped movable frame is pivoted at its front end on a horizontal axis. The outer end of each unit is supported either by the frame or by a floating beam carried by the frame, and the same applies to the inner end of each unit. Hydraulic cylinders are provided for raising and lowering the frame, and an additional hydraulic cylinder is provided for each of the floating beams. If two cutters are used, they can be adjusted to substantially fit either the convexity or the concavity of the pavement.

A depth control is provided for each end of each cutter. A frame support is provided to receive either a rocking arm having a roller ahead and an adjustable roller behind the cutter for use when cutting grooves, or the support will accept a rigid arm having an adjustable roller behind the cutter when cutting bumps.

A liquid coolant is supplied for the cutters from the tanker by means of a pumping system. The water is recirculated from the cutting area in the form of sludge back to the tanker by means of a vacuum apparatus. Said liquid is sprayed through jet nozzles adjacent the cutting blades and then is returned by suction nozzles positioned about the cutting units. There is also provided a shroud to cover the lower portion of the grooving apparatus, which enhances the vacuum operation by reducing the fluid pressure within the tank.

The weight of the tanker is used to effect an opposing force to the lifting efforts of the hydraulic cylinders attached to the U-shaped frame. The cylinders for the floating beams have a bearing support connected with the frame for adjusting the position of the floating beams with respect to the U-shaped frame.

BRIEF DESCRIPTION OF THE DRAWINGS

Referring more particularly to the accompanying drawings, which are for illustrative purposes only:

FIG. 1 is a side-elevational view of the invention showing a tractor pulling a cutter trailer and a water tank trailer.

FIG. 2 is a top plan view of FIG. 1.

FIG. 3 is a sectional view taken on line 3—3 of FIG. 1.

FIG. 4 is a sectional view taken on line 4—4 of FIG. 3.

FIG. 5 is a fragmentary perspective view of a filter unit as seen in FIG. 3.

FIG. 6 is a schematical cross-sectional view of the tank trailer and the vacuum system.

FIG. 7 is an enlarged side view of the grooving trailer with portions broken away for clearer illustration thereof.

FIG. 8 is a top plan view of FIG. 7 on line 8—8 thereof.

FIG. 9 is a cross-sectional view taken on line 9—9 of FIG. 8.

FIG. 10 is a cross-sectional view taken on line 10—10 of FIG. 9.

FIG. 11 is a cross-sectional view taken substantially on line 11-11 of FIG. 9 thereof.

FIG. 12 is an enlarged sectional view taken on line 12—12 of FIG. 11.

FIG. 13 is an enlarged sectional view taken on line 13—13 of FIG. 12 showing the cutter blades cutting grooves in a road surface.

FIG. 14 is an enlarged sectional view taken substantially on line 14—14 of FIG. 11.

FIG. 15 is a sectional view taken substantially on line 15—15 of FIG. 14.

FIG. 16 is an enlarged plan view of a portion of the grooving trailer positioned adjacent a curbing of a road surface.

FIG. 17 is a sectional view taken substantially on line 17—17 of FIG. 11 thereof.

FIG. 18 is a view illustrating the depth control wheel assembly for adjusting the depth of cut of the blades of the cutting assembly for cutting grooves.

FIG. 19 is an exploded perspective view of a supporting bracket of a water nozzle spray unit.

FIG. 20 is a partial perspective view of the grooving trailer assembly.

FIG. 21 is a sectional view illustrating the cutting assemblies supported in a somewhat universal mounting and positioned for cutting an irregular road surface.

FIG. 22 is a partial top plan view of the cutting assemblies with their inner ends adjacent each other.

FIG. 23 is a sectional view of a modified form of depth control for the cutting assembly adapted for cutting bumps.

FIG. 24 is a flow diagram of the hydraulic system for controlling the over-all operation of the leveling or grooving machine.

FIG. 25 is a schematic view of the transmission and power take-off shown in FIG. 24.

FIG. 26 is an enlarged fragmentary sectional view on line 26—26 of FIG. 23.

FIGS. 27, 28 and 29 are schematic views of modifications of the frame and floating beam support for the cutter or cutters.

DESCRIPTION OF THE PREFERRED EMBODIMENT

Referring more particularly to the drawings, there is shown in FIG. 1 a tractor-trailer vehicle, generally indicated at 10, comprising a tractor, indicated generally at 12, which is provided with a typical cab 14 and a Diesel or similar engine 16 mounted at the front end of the tractor frame 18. The frame 18 is provided with a swivel bed or hitch 20 for an operable connection between the tractor and a tandem trailer. Tractor 12 is movably supported by a set of front wheels 22 for steering the vehicle 10 and a back set of drive wheels 24 as generally found in such a vehicle.

However, there is included means for disengaging the engine power from the rear drive or traction wheels 24 to engage a hydraulic drive system when required. A more detailed description of said means will be described hereinafter.

There is operably connected to the swivel bed or hitch 20 of the tractor 12 a first tandem trailer unit 26 and a second tandem trailer unit 28 which is operably connected to said first trailer unit 26 by a swivel bed or hitch 29, supported on the rear of said first trailer unit. The first trailer unit 26 includes a leveling or grooving machine having a rotary cutter assembly 45, having a hitch 55 with the frame structure 30 which in turn has a hitch 20 with the tractor 12.

The trailer unit 26 comprises a carriage or frame structure 30 having a somewhat Z-shaped configuration which includes a horizontal box framework 32 having a mating member 33 for the swivel bed 20 and a platform 34, as seen in FIG. 2. Positioned rearwardly of said platform 34 and attached to frame 32 are a pair of parallel vertical beams 36, 36' spaced apart sufficiently to receive a transverse support bar 37, as seen in FIGS. 11 and 20. The beams 36, 36' are secured to the box frame 32 intermediate their ends. Rearwardly disposed from said beams 36, 36' is a second pair of matching beams 38, 38', said beams 36 and 38 being interconnected by overhead horizontal girder member 39, and beams 36' and 38' being similarly interconnected by an overhead horizontal girder member 39'. The girders 39, 39' have suitable transverse supports shown as I-beams 41 and 43, see FIGS. 2 and 7, welded at their ends into the girders 39, 39'. Attached to the lower portion of the rear vertical beams 38, 38' is a set of parallel frame members 40, 41a (FIGS. 8 and 20) having a platform to support the second swivel bed or hitch member 29 (FIG. 1). To carry the rear portion of the frame structure 30, there is provided a set of tandem wheels 42 positioned directly under the swivel bed member 29 whereby the front end of the second trailer 28 is operably connected thereto. The trailer 28 has rear wheels 165.

Referring more particularly now to FIGS. 7, 8, 9 and 11, in which a more detailed construction of the frame structure 30 is shown, there is provided a rotary cutter assembly, generally indicated at 45, operably mounted within the frame structure 30 of the carriage, said cutter assembly 45 comprising an independent drive engine 46 for operating a pair of rotary cutter units, indicated generally at 48 and 50, respectively. There is also provided means for supporting one of said cutting units in advance of the other, with the inner ends of said cutter units in substantial alignment. The supporting means comprises a U-shaped frame structure 52, as seen in FIGS. 8, 11 and 20, hingedly connected, as indicated at 53, at its forward open end to a header 54, said header 54 having a hitch 55 which includes an upper ball member 55a secured to the header 54 and a cooperating lower mating socket member 55b horizontally projecting from and secured to the transverse support bar 37. Oppositely and rearwardly disposed from the header 54 is the bight portion 57 of the U-shaped frame 52, said bight 57 being a rear transverse member having mounted thereon a slide 56 in the form of a cylindrical pin which is rotatably received in and guided for vertical and pivotal movement by vertical spaced angle irons providing slot means 58 carried by bracket 40' depending from frame members 40, 40a, see FIG. 20. The slot means 58 prevents lateral movement of said frame 52 with respect to the frame structure 30, while permitting rocking movement about a horizontal axis.

The beams 36, 36', see FIG. 20, have an angle bracket 49, 49', respectively, extending over the header 54 at opposite sides of its longitudinal axis to limit pivotal movement of header 54 about that axis, particularly when acted on by hydraulic cylinders 96 and 97, described later.

Due to the ball and socket hitch 55 at one end of the frame 52 and the slide 56 rotatably received in slot 58, the frame and cutter assembly 45 together are capable of being angularly adjustable about a horizontal axis $a-a$, seen in FIG. 11, said hitch and said slide permitting said cutter units to be readily adapted to an inclined surface, when required.

An independent engine 46 is used to impart the rotary movement necessary to operate the cutter units 48 and 50, said engine being mounted to the floating U-shaped frame 52 adjacent the bight portion 57 of the U by transverse channel members 59 secured at their ends to the side members 60, 60' of the frame 52. The power output shaft 61 of the engine 46 is provided with a plurality of pulleys 62 operably connected to pulleys 63 by belt 64, said pulleys 63 being securely disposed adjacent one end of a transverse shaft 65 which is rotatably supported in bearings 66. Disposed on the outer free ends of the shaft 65 are a plurality of additional pulleys 67 and 68, respectively. Said pulleys 67 and 68 are operably interconnected to cutter units 48 and 50 by drive belts 69 and 70, respectively. As shown in FIG. 7, belts 69 loop over the upper pulleys 67 to a set of lower pulleys 71 which are attached to a rotary shaft 72 of the cutter unit 48 adjacent one side of the frame 52. As shown in FIG. 8, the upper pulleys 68 are oppositely disposed from pulleys 67 on shaft 65 and interconnected to a lower set of pulleys 73 secured to a rotary shaft 74 of the cutter unit 50.

As mentioned above, the cutter units 48 and 50 are so arranged that one assembly is positioned forwardly of the other cutter assembly with the endmost disks 78a, 78'a of their inner ends 75 and 76 spaced apart the same distance as the spacing between adjacent disks (FIG. 22). Each cutter unit 48 and 50 comprises a plurality of evenly spaced-apart cutter disks 78, 78' having identical diameters and secured on the shafts 72 and 74 for rotation therewith. The disks are generally provided with diamond bits for cutting hard materials, such as cement and concrete.

In FIGS. 15, 20, 21 and 22, the shafts 72 and 74 are shown journaled at their outer ends by universal bearings 79 and 80, respectively, said bearings being supported within dual pillow blocks 82 and 83 along the rearward section of the side members 60, 60' of the frame 52. However, the inner ends 75 and 76 of cutter units 48 and 50, respectively, have their shafts 72 and 74 journaled in bearings 84 and 85, respectively, supported within dual blocks 86 and 87, respectively.

As shown in FIGS. 11 and 20, a pair of parallel floating beams 88 and 90 are provided along the inner longitudinal length of the frame 52 for supporting the inner ends of each cutter unit. Each floating beam 88 and 90 is independently hinged to the header 54 by brackets 92 and bolts 93, acting as hinge pins, at the forward end thereof. As shown in FIGS. 8, 11 and 20, the opposite or rear free end of each beam 88 and 90 is movably received within the U-shaped brackets 94 and 95, respectively. Said brackets are secured to the rear bight portion 57 of the frame member 52. It should be particularly noted that each beam is capable of being actuated individually with respect to each other, as well as with respect to the floating frame 52.

As shown in FIG. 20, the inner support block 86 for the inner end of shaft 72 is mounted on beam 90, whereas the block 87 for the inner end of shaft 74 is carried by beam 88, with the inner ends of those shafts in overlapping relation as also shown in FIG. 22. This construction makes it possible to preserve between the endmost disk 78a of the cutter assembly 48 and the adjacent endmost disk 78'a of the cutter assembly 50, at the inner ends of those cutters, for groove cutting purposes, a spacing which is substantially the same as the spacing between the adjacent disks on each cutter assembly, as indicated at 180 which represents the uniform spacing of kerfs or grooves in the pavement resulting from the cutting action of the innermost disks of both assemblies. For bump cutting purposes, the inner ends of the cutters may overlap as shown in FIG. 29.

As shown in FIGS. 10 and 20, the frame 52 and the rotary cutting assembly 45 are lifted or lowered by means of a pair of hydraulic cylinders 96 and 97 which are hingedly connected at their lower ends 98 and 98' to the rear end of frame 52, and their upper ends 99 and 99' are hingedly connected to the underside of a transverse-extending beam 100 which is secured to the rear vertical beams 38, 38' of the frame structure 30. The bight or rear end 57 of frame 52 with the cutter assemblies 48 and 50 pivots about a horizontal axis passing through the hinge 53 and the hinge pins 93 of the beams 88 and 90. Since the tank trailer 28 is loaded with a dead weight of a large quantity of water, the frame structure 30 and the upper ends of cylinders 96 and 97 are held down from any vertical movement thereof when the cylinders 96 and 97 are activated, when the cutter assemblies 48 and 50 are in working engagement with the pavement. The force of the cylinders 96, 97 butt against the over-all weight of the tank which becomes an effective opposing force against the lifting effort of the cylinders 96 and 97. Not only can the frame 52 be adjusted vertically, but it can also be tilted at an angle through the longitudinal axis $a-a$ (FIG. 11) by adjusting the hydraulic cylinders 96, 97.

There is hingedly connected at the free or rear ends of beams 88, 90 hydraulic cylinders 101 and 102, respectively, for operating the rear end of each floating beam in different or similar vertical displacements. The hydraulic cylinders 101 and 102 are hingedly supported above the adjacent floating beams 88 and 90, respectively, by upside-down L-shaped brackets 103 and 103a which are fixedly secured to the rear 57 of the floating frame 52.

FIG. 21 shows an example of how the inner ends of the cutter units 48 and 50 can be positioned at a greater elevation than their outer ends to fit a convex road surface. The inner ends can also be adjusted lower than the outer ends to fit a concave road surface. Therefore, by adjusting the floating beams 88 and 90, the inner ends of said cutters may be raised or lowered with respect to their outer ends to substantially fit either a convexity or a concavity, as indicated at A in the pavement 104.

When it is desired to move to a different location and travel at comparatively high speed with the cutter assemblies 48 and 50 in elevated position, the cylinders 96 and 97 are operated to raise the rear end 57 of frame 52, and in so doing, the outer ends of the cutter assemblies are raised, their inner ends and the floating beams 88 and 90 being raised by reason of the brackets 94, 95, see FIG. 10. The brackets 94, 95 are carried by the frame member 57 and underhang the beams 88 and 90 to lift them when the rear end 57 of the frame is lifted. Brackets 94 and 95 are open at their tops to permit the upward movement of the beams 88 and 90 under working conditions, the brackets 94 and 95 then being in a lowered position free from supporting relation with the beams 88 and 90 which are then floated. The operator can adjust the pressure on the cylinders 101 and 102 to adjust the beams 88 and 90 and the inner ends of the cutter assemblies so as to suit working conditions and obtain a uniform depth of groove with resulting maximum length of life of the cutter disks.

As shown in FIGS. 1 to 6, 14 and 15, the rotary cutter assembly 45 is provided with a continuous flow of liquid coolant 106 which consists, generally, of water supplied from cell 162a of tank 44 of the end trailer 28. This water coolant is pumped by a pumping means 108 which is located at the front end of the tank 44 and is provided with a pair of flexible conduits, or hoses, 110 and 111 interconnected to separate spray nozzle means, indicated generally at 112 and 112'. In FIG. 15 there can be seen the hoses 110 and 111 attached to the lower portion of side member 60 of the frame 52 and oppositely arranged in like manner, each of which is operably connected to individual spray nozzle means 112 and 112'. The nozzle means 112 and 112' are identical and both comprise a tubular conduit or manifold 114 having a plurality of spray nozzles 116, see FIG. 19, spaced along the side of the conduit facing the cutting edge of the blades 78, 78' as they contact the pavement during cutting and grinding thereof, thereby spraying water for coating the blades or disks of the cutting units 48 and 50, respectively. As better seen in FIG. 14, a nozzle spray means for each cutter or grinder unit is attached at the free closed ends by brackets 118 and at the opposite ends by an adjustable bracket assembly, generally indicated at 120. The bracket assembly 120 is more clearly illustrated in FIG. 19, in which there is shown a spacer bar 121, which is secured to the inner lower portion of the side member 60 of the frame 52 by bolt 122. Also secured by bolt 122 is an adjustable arm 124 having one end provided with a slot 125 and the other end provided with a bearing 126. Said bearing 126 is adapted to receive a communicating neck member 127 of the conduit 114, which when mounted in said bearing is operably coupled to the hoses 110 and 111, not shown, whereby water from tank 44 can be pumped to the cutting blades.

In order to supply a continuous, uninterrupted flow of water to the blades 78, 78', there is provided a vacuum system, generally indicated at 130 in FIGS. 1, 2 and 6. This system is used to return the water, along with the sludge material created by the cutting or grinding of the pavement, to the tank 44. The vacuum system comprises a vacuum pump 132 mounted to the end tank trailer 28. This pump is operated by motor 134 by means of drive belt 135, as seen in FIGS. 1, 2 and 6. A vacuum is pulled from within the tank 44 through an outlet passage 136 located in the front upper wall of the tank cell 162a. The vacuum flow is indicated by arrows 137 from the tank 44 through passage 136 into pumps 132 where it is pumped to atmosphere through a manifold 138. As the pressure within the tank 44 is reduced by the vacuum system 130, a flow of water and sludge is created between the cutting assembly 45 and tank 44. This flow is accomplished by establishing a vacuum chamber 140 which is defined by a flexible and elastic shroud, indicated generally at 142, having a somewhat rectangular wall or curtain 144 secured to and depending from frame 52. Said chamber also includes an upper shield partition 145, see FIG. 14, to seal or close the top of the vacuum chamber 140. The lower edges 149 of the side walls 144 of the vacuum chamber 140 form a sealing contact with the pavement around the cutting units and the spray nozzles. Included within the vacuum chamber 140 is a plurality of suction nozzles 146 which are operably connected to a rectangular manifold 147 connected to conduits like 150, 152 and 160 in FIG. 6 which lead to said tank 44 for returning the water and sludge to said tank.

Referring to FIGS. 9, 14 and 20, the suction nozzles 146 are attached and depend downwardly from a rectangular tubular manifold 147. The manifold 147 is adapted to receive conduits 150 and 152, see FIG. 9, which lead to an overhead junction manifold 154, see FIGS. 2 and 6, said manifold 154 having a single input connection to the tank 44 through pipe 156, which is received in the upper rear portion of said tank to complete the return flow of the coolant and sludge to said tank. As shown in FIG. 14, a back-up group of suction nozzles 158 may be employed to recover leakage about the trailing shroud. This additional group of nozzles is supported by a tubular frame 159 acting as a manifold, also connected to the manifold 154 by a conduit 160 for return flow through pipe 156.

The schematic view of FIG. 6 shows the vacuum system with the shroud 142 in sealing contact with pavement 104, followed by nozzles 158. The arrows 161 show the return flow of the coolant through the conduits 150, 152 and 160, then into manifold 154, and again arrow 161a showing flow through pipe 156 into the rear section of the tank 44 in the area having a low pressure which is created by the vacuum system 130.

In order to accommodate an uninterrupted flow of water from the end trailer unit 28, its tank 44 has a plurality of sections, or cells, 162a to 162e capable of holding large quantities of coolant, such as water 106. As indicated in FIGS. 1 and 3, the tank 44 is fixedly secured to the trailer frame 164 and movably attached at its front end to the rear frame members 40, 40a of the first trailer unit 26 by means of the trailer hitch or swivel bed 29. Tank 44 and the trailer 28 are supported at the rear thereof by tandem vehicle wheels 165. A conventional protective body or shell 166 is provided to enclose the tank 44 as indicated in FIGS. 1 and 3.

Manhole covers 168, located above each cell 162a to 162e, provide access to the cells so that filters 170, which are removably mounted to each inner cell wall 172, can be replaced or cleaned, see FIG. 6. The filters are supported in frames 174, said frames being positioned about the edges of openings 176 in the lower central parts of partition walls 172, see FIGS. 3 and 5. As can be seen in FIG. 6, the return flow of water and sludge enters the upper rear cell 162e of the tank and, as the heavier sludge material settles to the bottom of the first cell, the light and smaller material will sift through the first filter and then on through to the next cell and filter. Each successive filter is made of smaller mesh material to trap the fine particles as they pass through each successive cell to the last cell, from which the water is then pumped back to the spray nozzles. It can be seen that the sludge material will settle to the bottom of the tank 44. Therefore, there is provided therein a clean-out opening indicated at 178 in the bottom of each cell or section 162a to 162e. There is also provided in the upper part of each wall 172 apertures 179, see FIGS. 3 and 4, whereby communication between each cell is accomplished so that a pressure drop is readily facilitated throughout the entire inner area of the tank 44.

Referring back to the cutting units 48 and 50, which in the previous description were described as being adjustable with relation to transporting and the accommodation thereof to different angular configurations of the road beds, there will now be described the cutting units with respect to the cutting and grinding modes of operation.

FIG. 12 shows a cross-sectional view of the cutting unit 50 which has the blades 78' securely fixed on shaft 74, the similar cutting unit 48 having blades 78 fixed on shaft 72. As shown in FIGS. 12, 13 and 22, for groove cutting purposes the blades 78, 78' are evenly spaced apart a suitable distance, generally about three-fourths of an inch on center, as required to cut a kerf of about one-eighth of an inch deep, as indicated at B. For bump cutting purposes the blades like 78, 78' are closely spaced, as well known.

For groove cutting purposes, each end of each cutter 48 and 50 is provided with a depth control device. For this purpose, as indicated in FIG. 11, cutter unit 48 has at its opposite ends the depth control devices 184 and 184a; and cutter unit 50 at its opposite ends has the depth control devices 185, 185a. Each depth control device is carried by a support bracket like 186 welded to the frame 52 for the outer ends of the cutters and welded to the floating beams 88 and 90 for the inner ends of the cutters.

As shown in FIGS. 23 and 26, bracket 186 is in the form of a box channel 251 acting as a shelf welded at its end 252 to the member 253 which represents either the floating beam or the frame member. The flat top 254 of the shelf 251 has arising therefrom spaced upright flat strips 255 and 256, and laterally across them is welded a rear plate 257, and spaced in front thereof is a front plate 258. The plates 257 and 258 arise from and are welded at their lower ends to the top 254 of shelf 251. The plates 257 and 258 are rectangular and with the adjoining top 254 of the shelf 251 form a space which receives the top of either the arm 188 of the depth control device 185 in FIG. 12 or the top of the arm 250 of the depth control device 284 in FIG. 23. The plates 257 and 258 have aligned holes 259 and 260 to receive the shaft 261 of a bolt 189 having a head 262 behind plate 257 and at its front end having threads 263 for a nut 264.

All four of these depth control devices for groove cutting are alike; and one of them, namely 185 at the outer end of cutter 50, is shown in elevation in FIG. 12 wherein the frame member 60' has a bracket 186, the bolt 189 acting as a pivot support for the top of an inverted U-shaped rocker arm 188 having depending arms 188a and 188b. Arm 188a is at the front of the cutter 50 and terminates in a roller or wheel 190 which rides on the pavement ahead of the cutter. Arm 188b extends behind the cutter and has a pivotal support at 194 for an adjusting arm 192 which terminates at its lower end in a roller or wheel support 193 which rides on the pavement behind the cutter. The angular position of arm 192, and hence the depth that the cutter can cut into the pavement, is controlled by operating the adjusting screw 196 mounted in the arm 192 and bearing against an abutment 183 on arm 188b.

For bump cutting purposes, a modified form of depth control is provided for each end of each cutter unit, a typical one being shown at 284 in FIGS. 23 and 26 wherein, after unfastening bolt 189 to remove each of the depth control devices like 184, each bracket like 186 is employed to support a depth control device like 284 which has a single arm 250 which does not oscillate, but instead is rigidly fixed in the bracket. For this purpose, a wedge 264 is inserted between the top 254 of the shelf 251 and the underside of arm 250, being removably held in position by screws like 266 having threaded engagement with the top 254 of the shelf 251. The wedge 265 as shown in FIG. 23 extends on opposite sides of a vertical plane through the bolt 189 so that the arm 250 cannot swing either up or down about the axis of the bolt. The top 267 of the wedge 265 may be curved as shown in FIG. 23, or otherwise shaped to conform to the shape of the undersurface of the arm 250. As shown in FIG. 26, the arm 250 is in the form of a hollow tube rectangular in cross section; and this form is preferred also for the depth control 188 in FIG. 12. As the arm 250 in FIGS. 23 and 26 is fixed in position, the nut 264 is screwed down tight. In FIG. 23, the arm 292, adjusting screw 296, pivot 294 and roller or wheel 293 are of the same construction and serve the same purpose as described for the corresponding elements shown in FIG. 12.

It is apparent, therefore, that the bracket 186 may be used for either form of depth control shown in FIG. 12 or FIGS. 23 and 26.

The depth control shown in FIG. 12 makes it possible to keep a very close tolerance on the depth of the kerf being cut, even when the surface of the pavement 104 raises or lowers during a cutting pass, such as shown in FIG. 18. Since the center of the cutting unit is intermediate that of the two rollers 190, 193, any raising or lowering of a roller with respect to the other roller will cause only a slight rise to the cutting area of the blade 78'. That is, if the rollers 193 on the rearward side of the blades are thus one inch above the level pavement, then the cutter axis is raised only one-half the amount because of the arms involved. It should be noted, at this time, that the above description is with respect to the grooving operation of the machine.

When the machine is to be used as a leveling machine to level high spots or areas on the road beds that have imperfections, as seen in FIG. 23, rollers 190 and the front portion 188a of arm 188 are removed, thereby leaving only the trailing adjustable roller like 293 attached to one portion of the arm like 250. Prior to the leveling operation, additional blades are added to the cutter units 48 and 50 so that no space is left between adjacent blades and a smooth surface can thereby be cut by adjusting the height of the cutter blades through the proper setting of rollers like 293.

Referring to FIGS. 1 and 17, there is shown a temperature-responsive means, indicated generally at 197, located adjacent the trailing cutting edges of the blades 78, said temperature-responsive means checking whether the cutters are being overworked due to the speed of travel. A trough member 198 is extended downwardly from the frame 52, providing a pickup for some of the sludge kicked off from the cutter blades, said trough having a thermal couple 199 connected to a signal light (not shown) which is illuminated as a warning signal if the sludge becomes too hot, thereby allowing corrective action so that the diamond blades 78 will not be damaged.

There is provided a separate means for laterally adjusting the position of frame 52 by repositioning hitch 55 and the slot means 58, which allows the shifting of the outer ends of the cutter units to be positioned closely adjacent to a curb 105, as seen in FIG. 16. It is possible to extend the outer cutter blades to within 12 inches of said curb. When the frame 52 is needed to be laterally moved, the hydraulic cylinders are also relocated on additional brackets secured to the underside of the transverse beam 100, as shown in phantom lines in FIG. 10. In FIG. 11 the phantom lines show the relocation of hitch 55, along with frame 52.

It is undesirable for the Diesel engine 16 in the tractor 12 to operate at low gear and directly drive the equipment at slow speed because it would damage the blades 78, 78' if they met an obstruction. Hence, a hydraulic drive from the engine 16 is provided, as indicated in the flow diagram in FIG. 24 and in FIG. 25.

Engine 16 has a conventional clutch 200. Motor 234 is connected to the input of a four-speed transmission unit T1 by a belt and pulley arrangement indicated at 207. Transmission unit T2 has a clutch handle H1 to connect T2 in gear or in idle position out of gear. T1 has a four-speed gear transmission controlled by handle H2. When handle H1 is operated to make T2 idle, engine 16 drives through the four-speed transmission T1 to the drive shaft 242 and differential D and the wheels 24. This condition prevails when traveling at comparatively high speed from one location to another one with the cutters in raised idle position. At this time fluid pressure retained in the cylinders holds the cutters in elevated position, a suitable catch, not shown, being provided, if desired.

When it is desired to cut bumps or grooves, the equipment is moved at comparatively slow speed, the engine 16 at this time driving the pumps P1, P2 through the five-speed transmission T5 and belt and pulley arrangements 206 and 208, the clutch handle H3 being operated to disconnect the transmission T5 from the wheels 24 which are then driven by the fluid motor 234 through the transmissions T1 and T2. The handles 201 and 202 for the power take-off can be operated to either engage or disengage the drive of pumps P1 and P2 with respect to the engine 16, as indicated by arrows 203 and 204.

The fluid pressure from pump P1 is used to supply pressure to the two hydraulic cylinders 96 and 97, and the two small hydraulic cylinders 101 and 102. The pressure fluid line 210 leads from the pump P1 to control valves 212 and 213, then through lines 214 and 215 to operate one cylinder 97, and through similar lines 216 and 217 to operate the second cylinder 96, the lines 214 and 216 being provided with pressure gauges G1 and G2 and pressure relief valves 218 and 220, respectively. The relief valves 218 and 220 have lines like 221 connected to an oil reserve tank 222. A return line 223 connects the oil reserve tank 222 to the pump P1, and line 223' connects tank 222 to pump P2. The small cylinder 101 is operably connected to pump P1 through fluid lines 210, 224 and 225, said line 225 being provided with a pressure gauge G4 and a pressure relief valve 226 between the cylinder and the control valve 228, said valve 228 receiving fluid pressure from line 210. The cylinder 102 is connected to pump P1 through fluid lines 210, 209 and 211. Line 209 is provided with a pressure gauge G3 and a relief valve 219 between the cylinder and the control valve 205. Pump P2 supplies pressure through line 230 and filter F to line 230a leading to a power-steering device 229 which operates the cylinder 231 operably attached to the front steering wheels 22 of the tractor 12. Flow lines 232 and 233 service the cylinder 231 between the steering device 229 and also provide a reservoir return line 233a from the device 229 to the reservoir 222. Pressure line 230, in addition, via line 230b supplies pressure to operate fluid motor 234 through a control valve 236. Each control valve 212, 213, 205, 236 and 228 is connected to the reserve tank 222 by return line 235. Lines 237 and 238 supply the pressure fluid from said valve 236 to the motor 234.

The pressure relief valves like 218 insure that a suitable value of pressure is always available to operate the cylinders, the pump P1 being operated to supply a pressure in excess of the desired pressure, the surplus being by-passed. The gauges G1 to G4 are arranged on a suitable panel 246 adjacent the driver's seat 244 so that he can inspect the pressure being supplied to each cylinder and operate the valves like 212, 213, etc., accordingly.

The modifications shown in FIGS. 27 to 29 have a number of features in common with the form shown in FIG. 20. These common features include upright frame members in the form of I-beams like 36' and 36 having a crosspiece like 37 carrying one member of a hitch like 55, the companion hitch member being on a header like 54 having a hinge connection like 53 on a transverse horizontal axis with the forward ends of the U-shaped frame like 52, the header also having a hinge connection on the same axis with floating beams for supporting the cutters, and hydraulic cylinders being provided for operating the frame and the floating beams.

In the form shown in FIG. 27, two cutters are employed, cutter 300 having its outer end 301 carried by a bearing on floating beam 302 having a hinge connection 318 with header 354 on the same horizontal axis as the other hinges in FIG. 27. The inner end 303 of cutter 300 has a bearing support in a frame member 304 which is fixed at its rear end 305 to the U-shaped frame 352, while having a hinge connection 306 with header 354 on the above-mentioned horizontal axis. Cutter 307 has an inner end 308 having a shaft which overlaps the shaft of the inner end 303 of cutter 300. The inner end 308 has a bearing support in a frame member 309 having a rear end 310 fixed to the frame 352 and having a front end having a hinge connection 311 with header 354 on the above-mentioned horizontal axis. The outer end 312 of cutter 307 has a bearing support in a floating beam 313 having a forward end having a hinge connection 314 with header 354 on the horizontal axis. Like FIG. 20, FIG. 27 shows upright frame members 336, 336' having a crosspiece 337 which carries one member of a hitch 355, the companion member being carried by header 354. Frame 352 has a hinge connection 353 between each of its side members and the header 354. All of the hinge connections with header 354 are on the same transverse horizontal axis.

FIG. 27 shows the inner ends of cutters 300 and 307 spaced apart the same distance as the cutting disks as described in connection with FIG. 20, for groove cutting purposes.

The construction of the rear ends of the floating beams in all the forms in FIGS. 27 to 29 is like the construction shown in FIG. 20. In particular, in FIG. 27, the cylinder 315 which operates the frame, here shown as a single cylinder at the center of the frame, is operative to raise the frame and carry with it the rear ends of the floating beams to lift the cutters to idle position.

As in FIG. 20, in all the forms in FIGS. 27 to 29 the weight of the engine which drives the cutters is carried by the frame, being mounted on the side members like 60 and 60' in FIG. 20 whereby the weight of the engine is effective to hold down the outer ends of the cutters to cutting engagement with the pavement. The inner ends of the cutters in FIG. 20 are urged to cutting position by cylinders 101 and 102, whereas in FIG. 27 the outer end of cutter 300 is urged into cutting position by a cylinder 316 at the rear of the floating beam 302, the outer end of cutter 307 being urged to cutting position by a cylinder 317 at the rear of beam 313.

For example, the cylinders 101 and 102 in FIG. 20 may have a throw of one-and-one-half inches each side of a mean position, the pistons of these cylinders having a diameter of two-and-one-half inches. Cylinders 96, 97 may have a throw of 16 inches, their pistons having a diameter of three inches. When in cutting position, the weight of the engine holds the outer ends of the cutters in FIG. 20 to the work so that the total downward force on the outer ends of the cutters is equal to that weight plus the adjustable force provided by cylinders 96, 97. A somewhat higher pressure is supplied to the cylinders 101, 102 to equalize the pressure on the outer ends of the cutters because the downward pressure on the inner ends of the cutters is not influenced by the weight of the engine, but is due solely to the pressure exerted by the cylinders 101 and 102.

In FIG. 28, a single cutter 319 is shown; and as indicated, this may have a length comparable to the overall length of the two cutters of FIG. 27. One end 320 of cutter 319 has a bearing carried by floating beam 321 having a hinge connection 322 with the header 323, the rear end of beam 321 having a hydraulic cylinder 324 to urge the associated end of the cutter to cutting position. The other end 325 of cutter 319 has a bearing support in floating beam 326 having a pivotal connection 327 with the header, the rear end of beam 326 having a cylinder 328 for urging the cutter to cutting position. At the center of the U-frame 329 is provided a hydraulic cylinder 330 for lifting cutter 319 to idle position.

In FIG. 29, the U-frame 331 is operated by a hydraulic cylinder 332 at the rear center of the frame. Two cutters are shown, cutter 333 overlapping the inner end of cutter 334 as indicated at 335, for bump cutting purposes. The opposite ends of cutter 333 are mounted in floating beams 356 and 357. The opposite ends of cutter 334 are mounted in floating beams 358 and 359. Each of the floating beams and each of the side members of frame 331 has a hinge connection on axis A—A with the header 360. Each floating beam has a hydraulic cylinder as indicated at 361, 362, 363 and 364. The cylinders in FIG. 29 serve the same purpose as described in connection with FIGS. 20, 27 and 28.

In FIGS. 27 to 29, a universal bearing is provided for each end of each cutter, similar to the showing in FIG. 21 previously described.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example; and I do not wish to be restricted to the specific forms shown or uses mentioned, except as defined in the accompanying claims.

We claim:

1. Pavement cutting apparatus comprising a vehicle having an elongated cutter device, a frame, said frame having forward and rear ends, said forward end having a hinge support on a horizontal axis, said frame having a longitudinal axis, a pivotal support supporting said frame for hinge movement on said longitudinal axis, a floating beam means associated with said frame and having forward and rear ends, said forward end of said floating beam means having a hinge support on a horizontal axis, means on said frame supporting the rear end of said beam means for restricted floating movement upwardly or downwardly, means associated with said frame for supporting one end of said cutter device, means supporting the other end of said cutter device on said floating beam means, and separate hydraulic cylinder means acting on said frame and on said floating beam means to control the active or idle position of said cutter device.

2. Apparatus according to claim 1, and means on said frame engagable with the rear end portion of said floating beam means to lift the same when one of said hydraulic cylinder means is operated to lift the rear end of said frame.

3. Apparatus according to claim 1, including a tractor, said hinge support at the forward end of said frame having a hitch connection with said tractor.

4. Apparatus according to claim 1, said cutter device comprising two cutters arranged end-to-end with the outer ends of said cutters supported by opposite sides of said frame, respectively, said floating beam means comprising a floating beam for the inner end of each cutter.

5. Apparatus according to claim 1 wherein said cutter device includes two cutters arranged end-to-end, said floating beam means comprising a floating beam at each end of each cutter.

6. Apparatus according to claim 1 wherein said cutter device includes two cutters arranged end-to-end, said floating beam means including a floating beam at the outer end of each of said cutters, the inner ends of said cutters being supported by beams having rear ends fixed to said frame and having forward ends having a hinge support on said horizontal axis.

7. Apparatus according to claim 1 wherein said cutter device comprises a single cutter having opposite ends each supported by a single floating beam constituting said floating beam means.

8. Apparatus according to claim 1, said hydraulic cylinder means acting on said frame at the center of the rear of said frame, said cutter device extending symmetrically on opposite sides of the longitudinal axis of said frame.

9. Apparatus according to claim 1, and an engine for operating said cutter device, means supporting said engine on said frame whereby the weight of said engine is effective to move said frame on said hinge support and urge said cutter device to cutting position, said cutter device having opposite ends each having a depth control device each having a wheel for engaging the pavement.

10. A tractor-trailer assembly comprising:
a tractor having an engine and traction wheels driven thereby,
a first trailer having a hitch connection with said tractor, said first trailer having a frame member having a hitch connection with said tractor,
a pair of parallel floating beams hingedly attached to said frame member and positioned longitudinally therein,
a pair of cutter units having outer ends having universal bearings carried by said frame member, said cutter units having inner ends operably attached to said floating beams, respectively, for vertical movement of said inner ends independently of said outer ends thereof, said frame having a longitudinal axis, a hydraulic cylinder means acting on said frame on each side of said axis, means supporting said frame for movement about said axis, a hydraulic cylinder means for each of said beams, and
an engine on said first trailer for rotating said cutter units.

11. Pavement cutting apparatus comprising a vehicle having an elongated cutter, support means for supporting said cutter in a generally transversely extending position relative to the direction of travel on a pavement, said support means comprising a frame having a longitudinal axis extending lengthwise of the direction of travel, said cutter extending transversely of said frame, separate hydraulic cylinder means for acting on said frame on opposite sides of said axis, and other hydraulic cylinder means for adjusting the vertical position of one end of said cutter with respect to said frame.

12. Pavement cutting apparatus comprising a vehicle having an elongated cutter having a shaft and a bearing at each end of said shaft, a bearing support member for each of said bearings, each of said bearing support members being elongated in the direction of travel and having a forward end, a pivotal support supporting the forward ends of said bearing support members for pivotal movement on a horizontal axis transversely to the direction of travel, separate hydraulic cylinder means acting on each of said bearing support members to control the active or idle position of said cutter, means supporting said bearing support members for hinge movement on a longitudinal axis, and depth control means associated with each end of said shaft for controlling the depth of cut.

13. Apparatus according to claim 12, each of said bearing support members being in the form of a floating beam, a frame having a forward end having a pivotal support on said horizontal axis, and means on said frame supporting the rear ends of said beams for floating movement upwardly or downwardly.

14. Pavement cutting apparatus comprising a vehicle having an elongated cutter extending in a generally transversely extending position relative to the direction of travel on a pavement, means for supporting each end of said cutter, said supporting means comprising a depth control support having an upper portion having a supporting connection with said supporting means, said support depending from said supporting means and terminating in an adjustable extension having a wheel following said cutter, a hinge between said support and said extension, and a screw for adjusting the angular position of said extension to adjust the position of said wheel and thereby adjust the cutting depth of said cutter, said support being in the form of a rocker, said supporting connection comprising a hinge connection between the upper portion of said rocker and said supporting means, said rocker also terminating in a wheel ahead of said cutter, said cutter having cutting disks spaced apart for groove cutting purposes.

15. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cyliner means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement.

16. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cylinder means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement, in combination with a water tank trailer having a tank for a liquid coolant supply for the cutters and means whereby the weight of said tank is effective in opposing the lifting effort of said first-mentioned hydraulic cylinder means for said frame.

17. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cylinder means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement, said additional hydraulic cylinders having a bearing support connected with said frame for adjusting the position of said beams with respect to said frame.

18. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cylinder means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement, said additional hydraulic cylinders having a bearing support connected with said frame for adjusting the position of said beams with respect to said frame, in combination with a tank trailer having a tank for a liquid coolant supply for the cutters, said frame having a forward hinge connection, and said first-mentioned hydraulic cylinder means bearing against a frame member of said tank.

19. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cylinder means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement, said frame and said floating beams each having a forward end portion having a hinge connection on a horizontal axis with a transverse member having a hitch, said frame being substantially in the shape of a U, the bight of the U being a rear transverse member having thereon a slide rotatable in and guided for vertical movement by a vertical slot means which prevents lateral movement, said hitch comprising an upper ball member and a lower socket member, said frame and cutters being angularly adjustable about a horizontal axis through said hitch and said slide permitting said cutters to adapt to an inclined surface.

20. Pavement leveling or grooving machine comprising at least two rotary cutters, means for supporting one of said cutters in advance of the other with the inner ends of said cutters in substantial alignment, wherein two of said cutters have outer ends supported by pillow blocks in a frame, hydraulic cylinder means for raising or lowering said frame, the inner ends of said two cutters each having a pillow block supported in a beam floating with respect to said frame, and an additional hydraulic cylinder for raising or lowering each of said floating beams whereby the inner ends of said cutters may be raised or lowered with respect to their outer ends to substantially fit either a convexity or a concavity of the pavement, said frame and said floating beams each having a forward end portion having a hinge connection on a horizontal axis with a transverse member having a hitch, said frame being substantially in the shape of a U, the bight of the U being a rear transverse member having thereon a slide rotatable in and guided for vertical movement by a vertical slot means which prevents lateral movement, said hitch comprising an upper ball member and a lower socket member, said frame and cutters being angularly adjustable about a horizontal axis through said hitch and said slide permitting said cutters to adapt to an inclined surface, including separate means for laterally adjusting the position of said hitch and said slot means permitting shifting of the outer end of said cutters to a position closely adjacent to a curb.

21. Pavement cutting apparatus comprising a vehicle having a header, said header having a hitch element for pivotal movement on a longitudinal axis extending transversely of said header, an elongated cutter extending substantially parallel to said header, means associated with said header for supporting said cutter for pivotal movement on a horizontal axis including a floating beam pivotally connected to said header for supporting one end of said cutter, and separate fluid pressure operated means acting to snub or lift opposite ends of said cutter including fluid pressure means acting on said floating beam.

22. Pavement cutting apparatus comprising a vehicle having a header, said header having a hitch element for pivotal movement on a longitudinal axis extending transversely of said header, an elongated cutter extending substantially parallel to said header, a U-shaped frame, said frame having opposed parallel arms having front ends having a pivotal connection with said header on a horizontal axis, a floating beam having a front end pivotally connected to said header on said axis for supporting one end of said cutter, means associated with said frame for supporting the other end of said cutter, and separate fluid pressure means operative to raise or lower said floating beam and said frame, respectively.

* * * * *